United States Patent [19]

Nilsson et al.

[11] Patent Number: 4,564,495
[45] Date of Patent: * Jan. 14, 1986

[54] METHOD OF PRODUCING A CONTAINER

[75] Inventors: Torsten Nilsson, Pråmvägen; Kjell M. Jakobsen, Hökvägen, both of Sweden

[73] Assignee: PLM AB, Malmo, Sweden

[*] Notice: The portion of the term of this patent subsequent to Sep. 20, 2000 has been disclaimed.

[21] Appl. No.: 443,918

[22] Filed: Nov. 23, 1982

[30] Foreign Application Priority Data

Nov. 26, 1981 [SE] Sweden ............................. 8107045

[51] Int. Cl.⁴ ................... B29C 17/02; B29C 17/07
[52] U.S. Cl. .................................. 264/291; 264/531; 264/532; 264/535; 264/235; 264/292; 264/346; 425/529; 425/393
[58] Field of Search ............... 264/523, 531, 532, 533, 264/534, 535, 291, 292, 235, 346; 425/525, 526, 529, 392, 393

[56] References Cited

U.S. PATENT DOCUMENTS 4,108,937 8/1978 Martineu et al. ............... 264/532 X
4,405,546 9/1983 Jacobsen et al. ............... 264/532 X
4,409,176 10/1983 Jacobsen et al. ............... 264/532 X Primary Examiner—Jan Silbaugh
Attorney, Agent, or Firm—Roberts, Spiecens & Cohen

[57] ABSTRACT

A method of producing a container of polyethylene terephthalate or similar thermoplastic material from a tubular blank of amorphous material. A mechanical forming element moves a transitional zone between amorphous (thicker) material and thinner oriented material stretched to flow during simultaneous elongation of the blank in the direction of movement of the transitional zone. The stretched and oriented material is heated to a temperature higher than the temperature of the material immediately before stretching. As a result, the internal stresses produced in the material during earlier stretching are relieved. Heating causes the length of the material in the direction of stretching also to be reduced. Each subsequent forming stage for shaping the container takes place at a temperature lower than the temperature at the immediately preceding forming stage.

7 Claims, 13 Drawing Figures

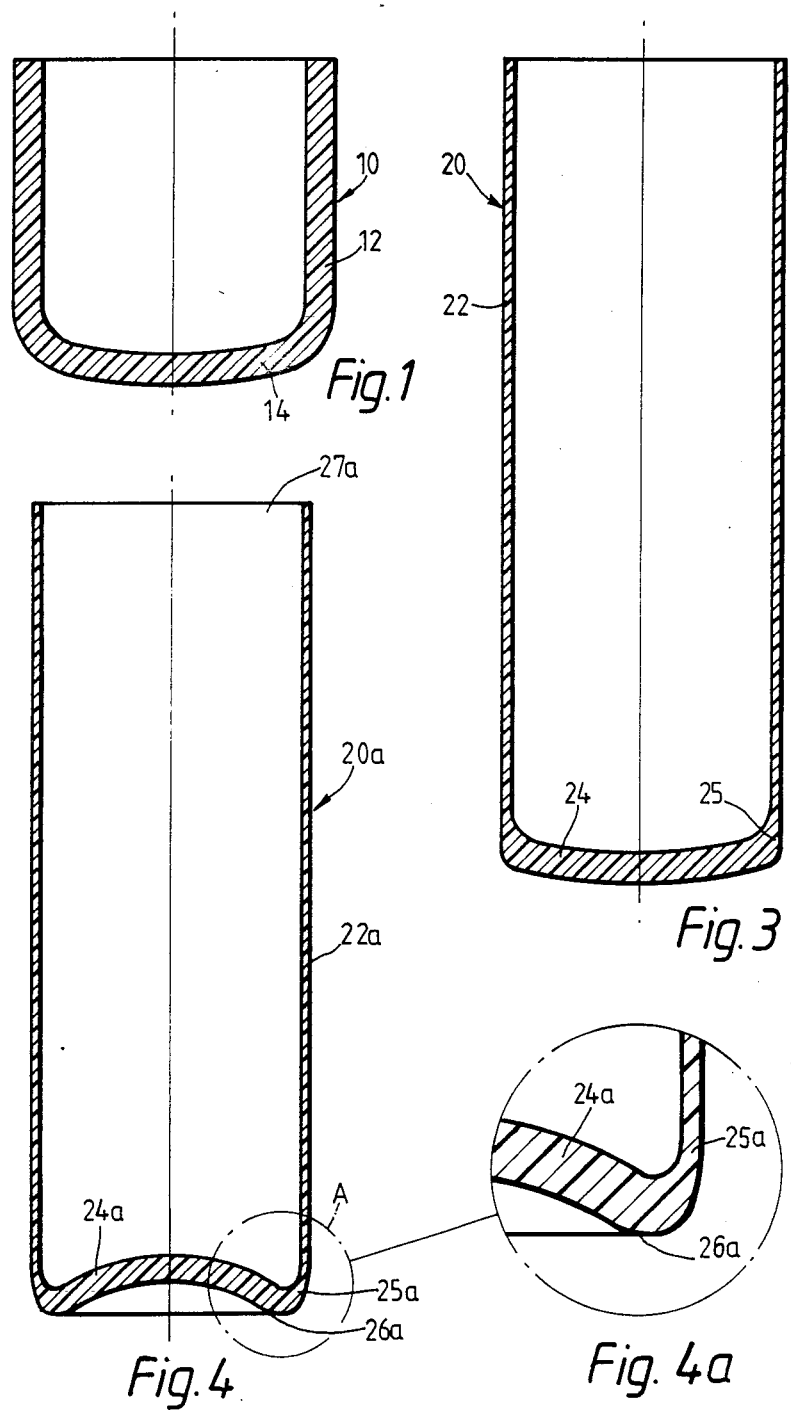

METHOD OF PRODUCING A CONTAINER

FIELD OF THE INVENTION

The present invention relates to a method of producing a container of thermoplastic material, preferably of polyethylene terephthalate, from a tubular blank of chiefly amorphous material which is reshaped into the container and, more precisely, to a method according to which the material in the tubular blank is stretched to flow and the stretched and oriented material is heated to a temperature higher than the temperature of the material immediately before stretching in order to relieve the internal stresses arising in the material during stretching with simultaneous reduction of the length of the material in the direction of stretching, each subsequent forming stage for the formation of the container taking place at a temperature which is lower than the temperature at the immediately preceding forming stage.

PRIOR ART

In the field of packaging there exists a need for containers of thermoplastic material which are capable of resisting an internal pressure of at least 7 kgf/cm$^2$ for the storage of carbonic beverages, e.g. beer or soft drinks. It has no far not been possible at reasonable cost to produce containers which under unfavorable conditions, e.g. high temperature, are capable of withstanding such internal pressure without simultaneously undergoing deformation to an undesirable extent.

According to known techniques it is possible to produce bottles with a mouth portion of monoaxially oriented material usually with a cylindrical container body of biaxially oriented material and with a central bottom part of amorphous or thermally crystallized material.

Such containers have a container body in which biaxial stretching of the material is obtained by a procedure through which the degree of stretching in the material in the axial direction of the container body and the circumferential direction of the container body respectively is mainly determined by the willingness of the material itself to elongate when the blank is subjected to an internal pressure in connection with blowing it into the shape of a container. As a rule, insufficient stretching of the material along the axis of the container is obtained although in certain applications attempts have been made to improve this stretching by a mechanical device in the form of a mandrel which elongates the blank along its axis in the initial stage of blowing the blank into the shape of a container. Examples of this technique are to be found in GB No. 1 536 194 and GB No. 2 052 367.

It is known that polyethylene terephthalate, henceforth abbreviated to PET, which is stretched monoaxially and particularly biaxially about three times along each axis acquires extremely good material properties, see U.S. Pat. No. 4,153,667, for example. One extremely sure and technically effective method of achieving such stretching is to stretch the material until flow occurs. Examples of techniques where such flow occurs are given in GB No. 2 052 365 and GB No. 2 052 367.

PET which is stretched so that flow occurs has, as mentioned above, extremely high tensile strength combined with little elongation. On reshaping of blanks containing such material it is therefore not possible to stretch the material additionally in the previous direction of stretch in order to obtain the desired shape of the container.

Further, on heating PET which has been stretched and thereby oriented, the material shrinks in the stretching direction. Shrinking occurs both when stretching has been carried so far that flow has occurred in the material and also in the case of lesser stretching conditions and regardless of whether the stretching is monoaxial or multiaxial, e.g. biaxial. These properties accentuate the problems associated with reshaping a blank into a container.

The physical properties mentioned above do not apply solely to PET but to a greated or lesser degree also to many other thermoplastic materials. Examples of such materials are polyhexamethylene-adipamide, polycaprolactum, polyhexamethylene-sebacamide, polyethylene-2.6-naphthalate and polyethylene-1.5-naphthalate, polytetramethylene-1.2-dioxybenzoate and copolymers of ethylene terephthalate, ethylene isophthalate and other similar polymer plastics.

SUMMARY OF THE INVENTION

According to the present invention, a tubular blank of mainly amorphous material is used, one end of which is closed and its cylindrical portion fully or partially stretched so that material flow occurs. Stretching takes place in a preferred version by means of a mechanical forming element which moves a transitional zone between material stretched to flow and amorphous material (material not yet stretched) during simultaneous elongation of the blank in the direction of movement of the transitional zone. In that connection, all material in the cylindrical portion of the blank is preferably stretched. Through stretching to flow, the material acquires an orientation chiefly along the axis of the blank while the bottom closure of the blank consists mainly of amorphous material.

The preform now formed consists of material which is not suitable for additional stretching along the axis of the preform. On the other hand, the material permits stretching in the circumferential direction of the preform.

The next stage in forming the container consists of forming the mouth portion of the future container and in certain applications its bottom part as well. Particularly when producing a bottle, the mouth portion is provided with threads, a "pilfer-proof ring" and, where applicable, a pull ring. In connection with the production of a can-like container the bottom part of the container is as a rule also formed.

In a subsequent production stage the actual container body is then formed by a blowing process.

Forming of the mouth portion, the bottom part and the container body takes place with the material at a temperature within the thermoelastic temperature range, i.e. at a temperature higher that the glass transformation temperature (TG) range of the material.

On heating the material to forming temperature the material nevertheless shrinks in the stretching direction, which means that the axial length of the preform is reduced. In that connection it has surprisingly proved that material which has been heated to a certain temperature and then cooled and afterwards heated to the same temperature again does not undergo any additional shrinking. On the other hand, if it is heated to a higher temperature than before, the material shrinks additionally.

As mentioned above, the invention is applied within the known forming technique, according to which a container is produced in a number of consecutive forming operations with the material in each operation being heated to forming temperature. Each operation takes place as a rule in separate equipment. In connection with the production of the container an injection-moulded or extruded blank is used which in an initial forming operation is reshaped in order to form the mouth portion of the container. In certain applications of the invention particularly in connection with the production of can-like containers, the bottom part of the future container is preformed or finally formed in a separate forming operation.

In the forming operation during which the container is finally formed, the finally formed mouth portion comprises in accordance with the known technique a rigid part of the blank by means of which the blank is located and secured in the blowing mould. By pressurizing the interior of the blank, and with the material of the blank at blowing temperature, the blank is reshaped into the container.

As mentioned above, the invention relates to a method of producing a container whose mouth portion, container body and/or, where applicable, neck portions consist of material with an orientation along the axis of the container corresponding to that which arises in material that has been stretched so that flow occurs. In certain applications only certain parts of the container body, for example, consist of such material. In order to control stretching of the material to flow, stretching takes place, as has already been mentioned, by means of a mechanical forming element which already in the blank stretches the parts of the material to flow. As has also been mentioned, such parts of the material have certain physical properties which in accordance with known techniques cause problems in connection with the continued forming operations. One such property is the tendency of the material to shrink and another such property is the difficulty of stretching the material additionally.

The problems due to the tendency of the material to shrink are eliminated according to the invention in that the material stretched to flow is heated after stretching to a temperature higher than each temperature to which the material is heated during the subsequent forming operations. As a result, no additional shrinking of the material takes place during these operations.

The problems due to the difficulty of stretching the material additionally are eliminated according to the invention in that during the forming operations the parts of material stretched to flow and subsequently shrunk retain in each forming operation the length the part of material acquired on conclusion of the shrinking process as described in the previous paragraph.

In accordance with the invention, the property displayed by the material of not shrinking further if it is again heated to a temperature lower than the temperature at which shrinking was originally performed is used to ensure that already formed parts of the future container retain their shapes during the forming operations that lead to the container. Through application of a maximum temperature for the intial forming operation, further shrinking of the material is avoided and the use of a lower temperature at each subsequent forming operation ensures that parts of material already formed do not lose their shape during subsequent forming operations.

According to the invention, the axial length of the stretched and shrunk material of the blank is adapted to the axial length of corresponding parts of material in the future container. This takes place through a combination of axial material length in the amorphous blank and choice of temperature at which shrinking of the axial length of the stretched material is achieved. For a certain axial length of stretched but not yet shrunk material a pre-determined axial length of shrunk material is obtained through choice of shrinking temperature to give the desired axial length of shrunk material. On final forming of the container the shrunk axial length of the material is accordingly retained while on the other hand a change in the length of the part of material in a direction at right angles to this occurs in connection with the blowing-out or final forming of the container.

In conjunction with the material passing through the mechanical element in order to undergo flow, the material has a temperature in the range of, or somewhat higher than, the glass transformation temperature (TG) of the material.

In the case of PET, in conjunction with the material passing through the mechanical element in order to undergo flow, the material has a temperature of at least 70° C. and preferably a temperature within the 70°–105° C. range.

The highest temperature to which PET is heated during conversion of the blank into the container, i.e. the shrinking temperature, amounts to a maximum of approximately 160° C. and in each subsequent forming operation the material has a temperature lower than the temperature at the immediately preceding forming operation by about 5° C.

BRIEF DESCRIPTION OF THE FIGURES OF THE DRAWING

The invention is described in greater detail with reference to a number of figures, where FIG. 1 is a sectional view of a tubular blank of chiefly amorphous material, FIG. 3 shows a blank whose tubular portion consists of material which has undergone flow, FIG. 4 is a sectional view of a stretched preform, FIG. 4a is an enlarged view of detail A in FIG. 4.

DETAILED DESCRIPTION

Depicted in FIG. 1 is a tubular blank 10 of chiefly amorphous material with a cylindrical portion 12 and a closure 14 at one end.

Figure 2A:
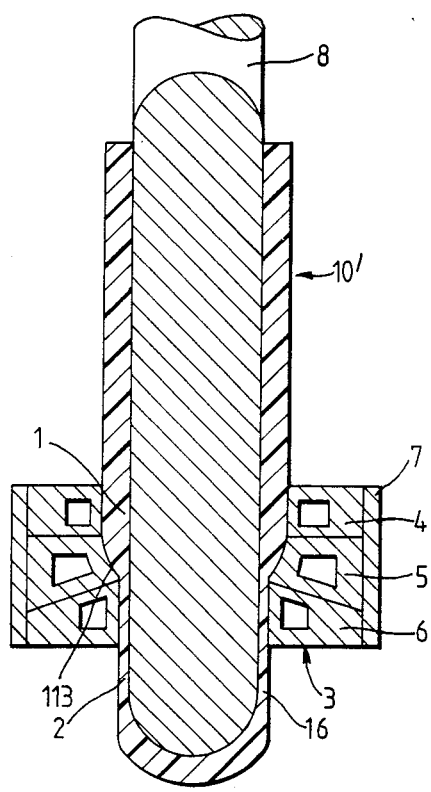
FIGS. 2 and 2a are sectional views of a tubular blank and a draw ring for stretching the material of the blank.
Figure 2:
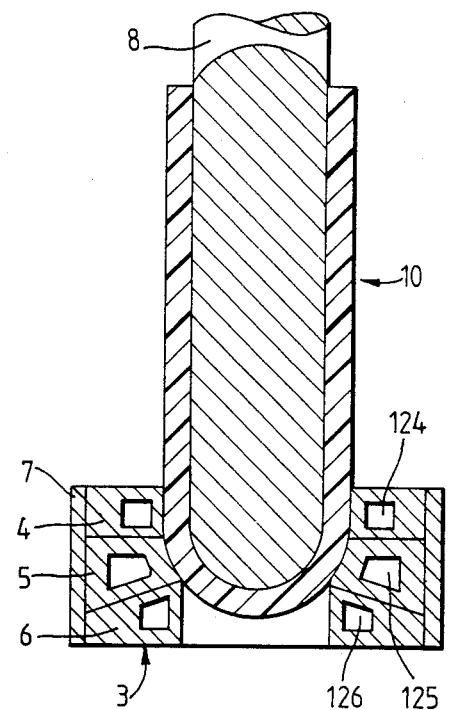

FIGS. 2 and 2a show a draw ring 3 with three draw ring segments 4,5,6 in which are arranged liquid passages 124,125,126. The draw ring segments are situated beside each other and are held together by a connecting ring 7. The figures also show an internal mandrel 8. Material stretched to flow in the blank 10 is designated by reference numeral 2 and material which has not yet been stretched to flow by reference numeral 1.

FIG. 3 shows a preform 20 formed from the blank 10 by stretching the cylindrical portion 12 of the blank 10 to flow. The preform thus formed has a cylindrical portion 22 and a bottom part 24. The transition between material stretched to flow and the closure 14 of the blank is designated by reference numeral 25.

FIGS. 4 and 4a show the preform as in FIG. 3 with reshaped bottom part 24a. The equivalent to the previously-mentioned transition 25 between the cylindrical portion 22 of the blank and the closure 24 is here designated by reference numeral 25a. In the example shown, the bottom part 24 is reshaped with the material at a temperature below the thermoelastic temperature range of the material (below the TG range). The increase in the profile length of bottom part 24 as a result of reshaping means that the ring-shaped area of material 25a stretched to flow consists of material which in preform 20 comprises material which has undergone a certain degree of stretching on passing through the draw ring but not stretching to flow. The material in the ring-shaped transition 25a has a smaller initial radius than the material in the cylindrical portion. The figures also show a standing surface 26a and a mouth portion 27a.

Figure 5:
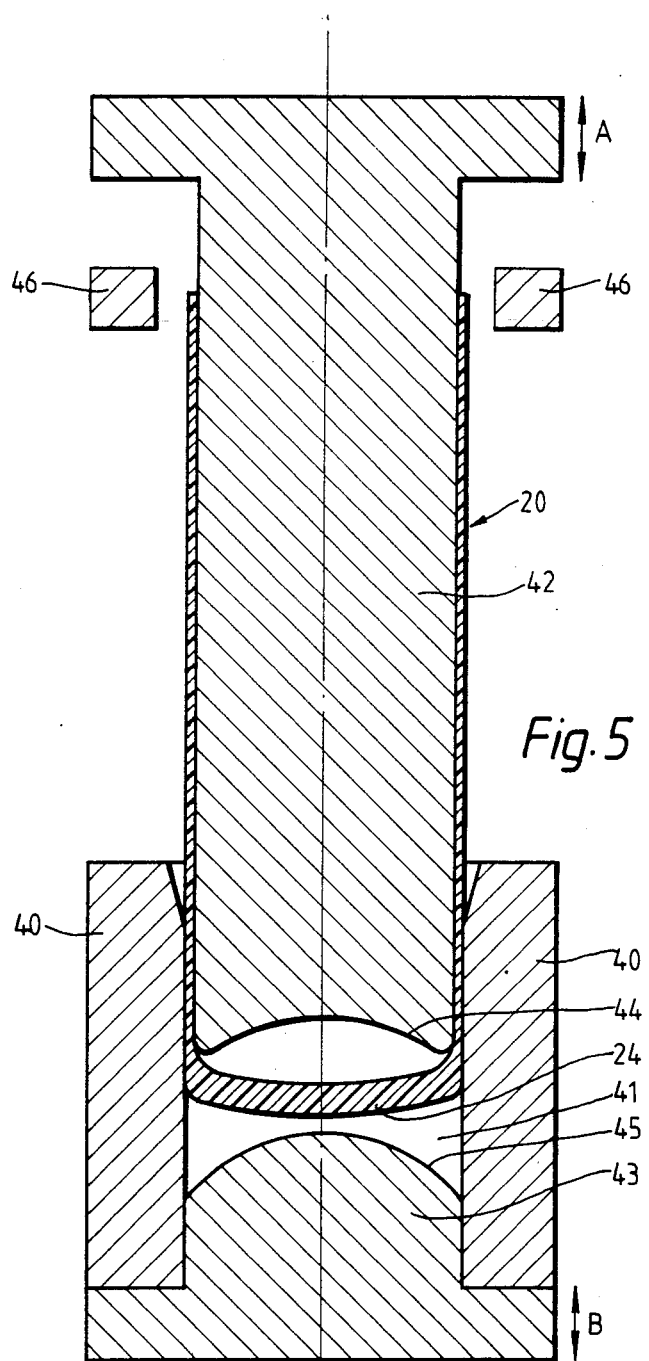
FIG. 5 shows a blank as in FIG. 3 in a device for reshaping the bottom part.

FIG. 5 shows a device for reshaping a preform 20 as in FIG. 3 into a preform 20a as in FIG. 4. Depicted in the figure is a locating body 40 with a cylindrical cavity 41 the diameter of which corresponds to the outside diameter of preform 20. A mandrel with a diameter adapted to the inside diameter of preform 20 comprises an initial forming element 42 which is movable along the axis of the cavity and relative to a second forming element 43. The first forming element is situated inside the preform 20 and the second forming element is situated on the other side of the bottom part 24 of the preform. This first forming element 42 presents a concave forming surface 44 to the bottom part 24 and the second forming element 43 presents a convex forming surface 45 to the bottom part. For the sake of simplicity, the driving element for the movements of the forming element has been omitted in the figure but driving elements can be arranged in accordance with any known technique. Further, the movement of the forming elements towards each other is so controlled that in the final forming position the distance between the forming surfaces of the forming elements corresponds to the thickness of the bottom part 24a. Depicted in the figure are stops 46 which regulate the maximum travel of the first forming element 42 in a direction towards the locating body 40. The directions of movement of the first and second forming elements are indicated by arrows A and B respectively.

Figure 6:
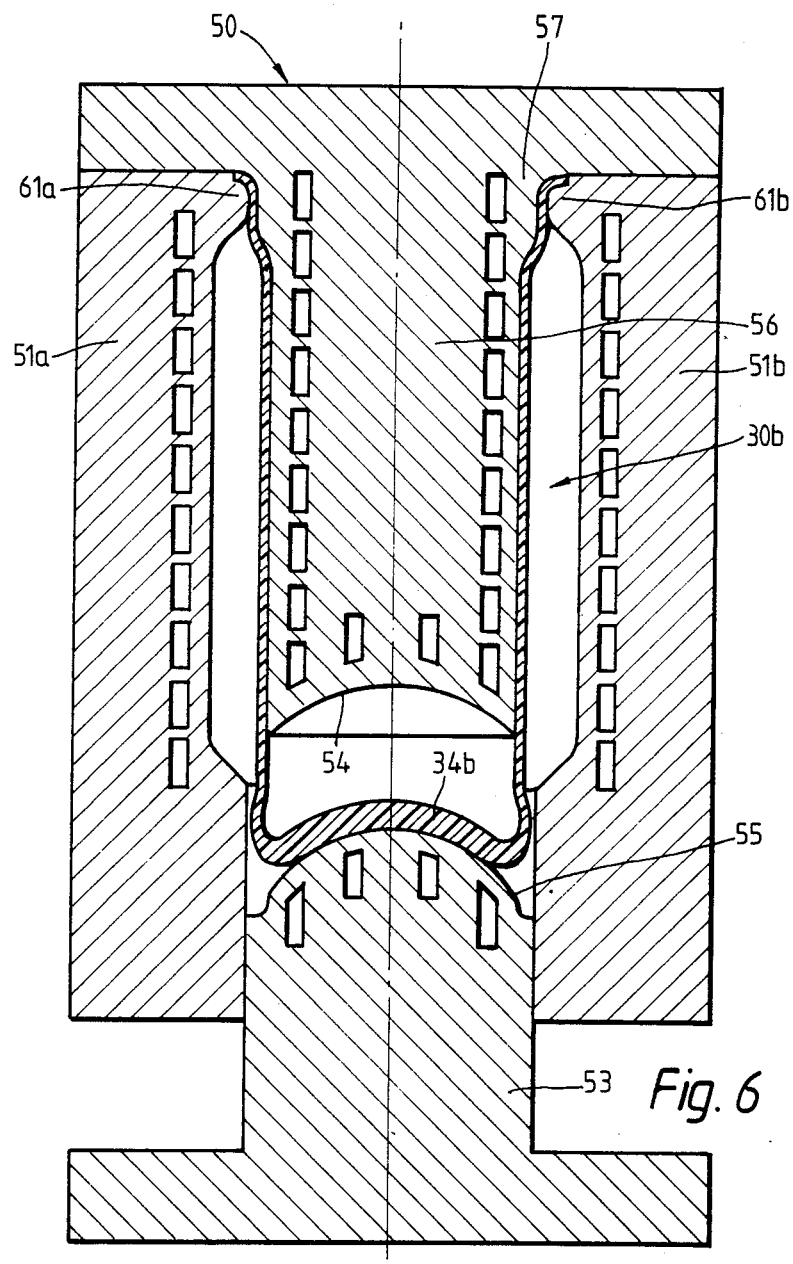
FIG. 6 shows a blank in a blowing mould.

FIG. 6 shows a version of a device for final forming of a preform as in FIG. 3 or FIG. 4. Even though the figure shows a preform 30b which has undergone shrinking through heating, the device as such is also suitable for reshaping a preform 20 or 20a which has not yet been shrunk.

The figure shows a blow mould 50 with two mould halves 51a, b and a bottom part 53 movable vertically in the cavity in the lower part of the mould halves. The bottom part 53 corresponds to the second forming element 43 mentioned earlier with reference to FIG. 5 and like it is arranged with a convex forming surface 55. A cylindrical mandrel 56 having a diameter mainly coinciding with the inside diameter of preform 30b and adapted to permit the mandrel to pass into the preform corresponds to the previously-mentioned first forming element 42 and like it is arranged with a concave forming surface 54. At its upper part the mandrel is arranged with a part 57 of larger diameter. The mandrel 56 is also movable in a vertical direction, partly in order to interact with the movable bottom part 53. The mould halves 51a, b have at their upper parts 61a, b a shape adapted to the shape of the part 57 of the mandrel having a larger diameter through which a forming space between the mandrel and the upper parts of the blowing mould halves is formed which is adapted to the shape of the mouth portion of the future container. In order to simplify the figures, the passages for the pressure medium and all driving elements for the movements of the mould halves 51, the bottom part 53 and the mandrel 56 are omitted.

Figure 7:
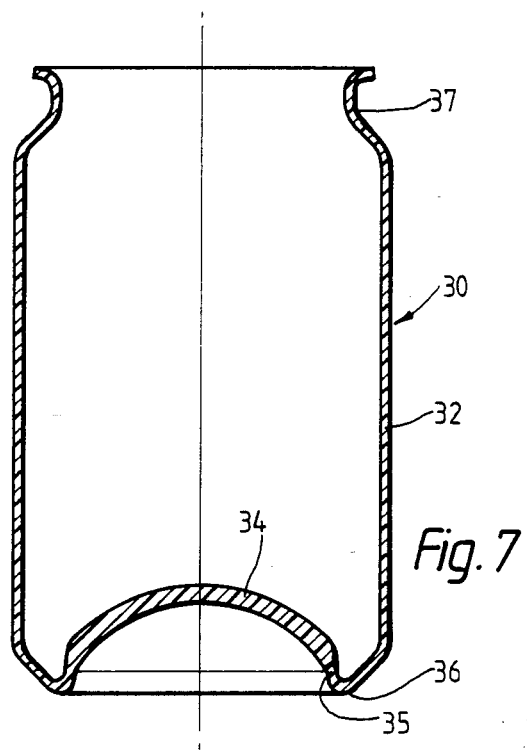
FIG. 7 shows a can-like container formed in the blowing mould of FIG. 6, FIGS. 8a–c show part of a device for forming threads, a pilferproof ring or pull ring.

FIG. 7 shows a can-like container 30 formed in a blowing mould as in FIG. 6. The contour length of the material stretched to flow in the mouth portion 37 of the container, the cylindrical portion 32 of the container and in the ring-shaped transitional area 35 corresponds to the corresponding contour length of the mouth portion 27a, the cylindrical portion 22a and the ring-shaped transitional area 25a after preform 20a has been heated and undergone shrinking. The central bottom part and the standing surface of the container are indicated by the reference numerals 34 and 36 respectively.

Figure 8A:
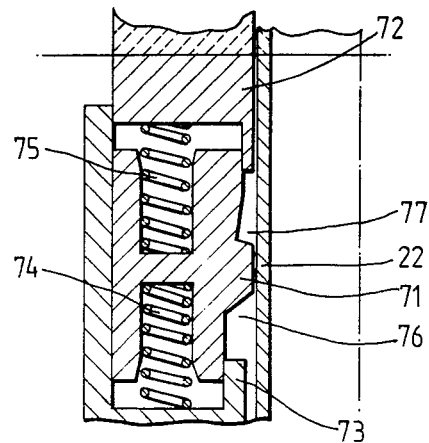
Figure 8B:
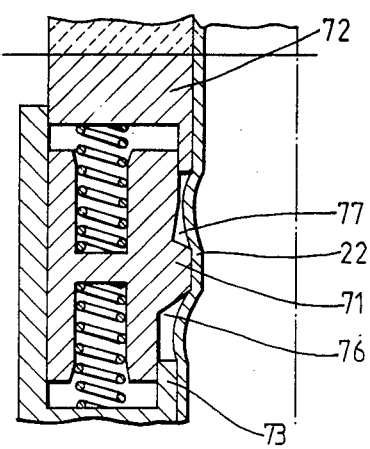
Figure 8C:
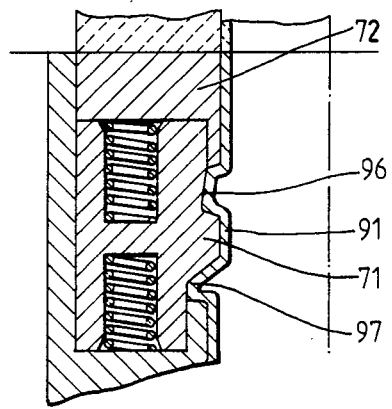

FIGS. 8a-c show part of a forming element for the formation of threads, a pilfer-proof ring or a pull ring, for example. An area of material stretched to flow has the reference numeral 22. Also depicted in the figures are a first movable mould wall part 71 and a second movable mould wall part 73. The mould wall parts are separated by springs 74, 75. Forming grooves 76, 77, the widths of which diminish when the mould wall parts are moved towards each other, are formed between the mould wall parts.

Figure 9:
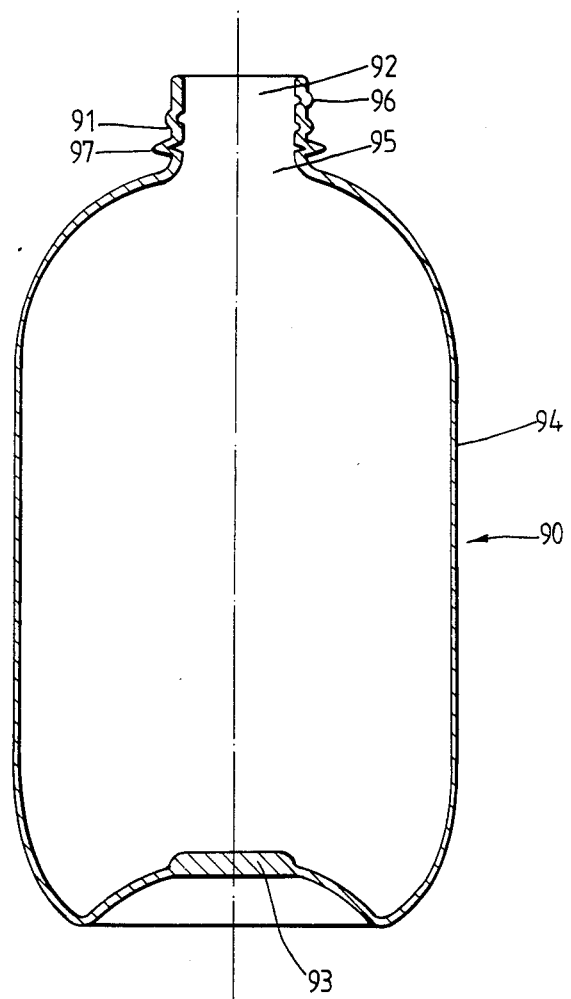
FIG. 9 is a sectional view of a bottle with a mouth portion formed in a device as in FIGS. 8a–c.

FIG. 9 shows a bottle-like container 90 with a mouth portion 92, a neck portion 95, threads 96, a pilfer-proof ring 97, a container body 94 and a central bottom part 93.

Reshaping of the blank 10 into a container 30 or 90 is begun by moving draw ring 3 from the position shown in FIG. 2 along the axis of the blank, whereby a transitional zone 113 is formed between the material 2 stretched to flow and amorphous material 1. Liquid passes through the passages 124-126 for thermal adjustment of the material through heating or cooling in conjunction with the material being caused to flow. The material is adjusted to a temperature in the range of or somewhat higher than the range of the glass transformation temperature (TG) of the material. In the case of PET, for example, the material has a temperature of at least 70° C. and preferably a temperature within the range of 70°-105° C. Even though the figures do not show any liquid passages in the mandrel 8 it is of course possible within the framework of the invention to arrange such passages for further adjusting the temperature of the material in conjunction with the stretching process.

In one example, when all material in the tubular part of the blank is stretched to flow, a preform is obtained which mainly corresponds with that shown in FIG. 3.

In one application of the invention where forming of the bottom part 34, 93 takes place in a separate forming operation, the preform 3 is placed in the cavity 41 of the locating body and then the first forming element 42 and the second forming element 43 are moved towards each other for reshaping of the bottom part 24. If the previously-mentioned temperature conditions are met, i.e. if the material is at a temperature below the TG of the material, supplementary stretching of the material takes place in the transition between material stretched to flow and the bottom part 24. The ring-shaped area of material 25a is achieved in this manner.

The preform 20a is afterwards heated to a temperature above TG, causing the internal stresses formed in the material to be relieved at the same time as the material undergoes shrinking. Preform 30b is obtained on conclusion of the heat treatment and placed in the blow mould 50. As a rule, the heat treatment takes place as a separate processing operation, which means that preform 30b must be heated again before the actual blowing operation. Reheating always takes place to a lower temperature than the temperature at which material shrinking took place.

Further illustrated in FIG. 6 is a reshaping of the mouth portion of the blank by means of the upper parts 51a, b of the mould halves and the larger diameter part 57 of the cylindrical mandrel 56. In certain applications, this reshaping of the mouth portion takes place in a separate forming operation with the material at a lower temperature than at the material shrinking temperature.

Blowing or expansion of the preform 30b to form the container then takes place at a lower temperature than the temperature at which the mouth portion was formed.

During blowing of the preform 30b to form the container, the movable bottom part 53 of the blow mould is moved towards the mouth of the container, whereby blowing takes place while maintaining of the profile length of the material stretched to flow.

FIGS. 8a–c show how the mouth portion is reshaped in order to form the threads 96 and pilfer-proof ring 97, for example, in the material which in the preform consists of material stretched to flow. Reshaping while maintaining the profile length of the material takes place here as well. FIG. 8b shows how the interior of the preform is pressurized, whereby a certain degree of stretching of the material occurs. In this way, firm contact of the material against parts of the mould wall parts 71, 72, 73 is ensured. Mould wall part 72 is subsequently moved towards mould wall part 71, whereby the thread 96 is formed through a folding-like process, following which the mould wall parts 72, 71, in contact with each other, are moved towards the fixed mould wall part 73, whereby the plifer-proof ring 97 is formed. This forming operation also takes place at a higher temperature but at a temperature lower than the temperature at which shrinking of the material took place. In connection with the subsequent blowing of the blank to form the bottle-like container 90, the material is heated to a temperature lower than the temperature at which the threads and the plifer-proof ring were formed, whereby the mouth portion retains its given shape and comprises a rigid part of the blank for securing it in the blow mould. Blowing of the preform to form the bottle-like container then takes place while maintaining the axial profile length of the blank, i.e. with a technique corresponding to the one described above with reference to FIG. 6.

The figures and procedures described above shall be regarded as an example of an application of the invention. They clarify the manner in which the axial length of the amorphous material after stretching of the material to flow and heating of it for shrinking has a value corresponding to the lengths (profile lengths) of corresponding parts of material in the formed container.

From the description, the possibilities of length adaptation through choice of the original length of the tubular blank 10 or choice of the temperature at which the stresses built-in on stretching are relieved, will easily be realized. Similarly, the description clarifies the possibility of forming the container with the material in each forming operation at a lower temperature than in the immediately preceding operation, which ensures that the form obtained in each forming operation remains intact during the next forming operation.

The invention indicates a manner of forming a container where it is possible to produce it step by step and in certain steps form an intermediate product containing parts of material with a shape coinciding with the shape of corresponding parts of material in the finished container.

What is claimed is:

1. A method of producing a container of thermoplastic material, preferably of polyethylene terephthalate (PET) from a tubular blank of amorphous material, said container having a body and a mouth portion, said method comprising reducing the wall thickness of a tubular blank of amorphous material while concurrently elongating the blank at a temperature conducive to orientation to orient the material of the thus stretched blank by engaging a mechanical forming element with said blank to form a transition zone between amorphous, thicker material and oriented, thinner material and relatively moving said blank and forming element to move said transition zone axially of the blank while concurrently elongating the blank, heating the thus stretched blank to a temperature above the temperature of the blank immediately before stretching to relieve internal stresses produced in said material during stretching, forming the container from the stretched blank in successive forming stages, and maintaining the temperature in each forming stage lower than the temperature in the immediately preceding forming stage.

2. A method as claimed in claim 1 wherein the temperature of the material in the last of said successive forming stages is higher than the highest temperature at which the formed container is to be used.

3. A method as claimed in claim 1 wherein the length of the amorphous blank and the length of the stretched blank are correlated with the highest temperature of the material during said forming of the blank into the container such that the length of the stretched material of the blank after heating to the highest temperature is substantially equal to the corresponding profile length of the material in the formed container.

4. A method as claimed in claim 1 wherein said material is polyethylene terephthalate (PET) and the highest temperature of the material during said forming of the blank to the container is a maximum of approximately 160° C. in the first forming stage, the material in each subsequent forming stage having a temperature lower than the temperature in the immediately preceding forming stage by approximately 5° C.

5. A method as claimed in claim 1 wherein the temperature of the material, when it passes the mechanical forming element to undergo flow, has a temperature in the range of or slightly higher than the glass transformation temperature (TG) of the material.

6. A method as claimed in claim 5 wherein said material is polyethylene terephthalate (PET), the material having a temperature of at least 70° C. when passing the mechanical forming element to undergo flow.

7. A method as claimed in claim 6 wherein the temperature of the material when passing the mechanical forming element is between 70° and 105° C.

* * * * *